United States Patent [19]

Buck

[11] Patent Number: 4,860,590
[45] Date of Patent: Aug. 29, 1989

[54] PRIMARY STANDARD GAS FLOW CALIBRATOR

[76] Inventor: Albert P. Buck, 3139 S. Orange Ave., Orlando, Fla. 32806

[21] Appl. No.: 939,758

[22] Filed: Dec. 9, 1986

[51] Int. Cl.⁴ .................. G01F 1/708; G01F 25/00
[52] U.S. Cl. ........................... 73/861.05; 73/3
[58] Field of Search ............... 73/861.05, 3; 425/223, 425/224

[56] References Cited

U.S. PATENT DOCUMENTS

| | | |
|---|---|---|
| 2,333,791 | 11/1943 | Hutchison, Jr. |
| 2,967,450 | 1/1961 | Shields et al. |
| 3,248,941 | 3/1966 | McArthur ............... 73/861.05 |
| 3,603,146 | 9/1971 | Bennett et al. |
| 3,681,985 | 8/1972 | Rudd. |
| 3,748,902 | 7/1973 | Guild ...................... 73/861.05 |
| 4,691,577 | 9/1987 | Lalin et al. ............... 73/861.05 |
| 4,762,004 | 8/1988 | Lalin et al. ............... 73/861.05 |

OTHER PUBLICATIONS

Advertising Brochure for "The Buck Calibrator".

*Primary Examiner*—Tom Noland
*Attorney, Agent, or Firm*—James H. Beusse

[57] ABSTRACT

An improved primary gas flow calibrator measures the flow rate of a gas source through a fixed volume by monitoring the travel time of a liquid soap film. The device comprises a novel mechanism for generating a single film of soap across a first end of a flow tube and an infrared light beam responsive timing system for determining the speed of a soap film moving through a portion of the flow tube. The device is a microprocessor-based system which comprises settable adjusting DIP switches for avoiding exacting dimensional tolerances of the flow tube during manufacture.

9 Claims, 2 Drawing Sheets

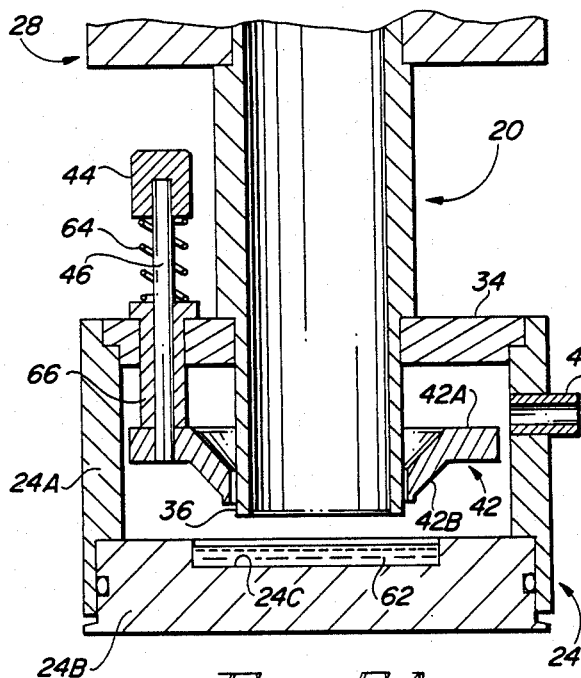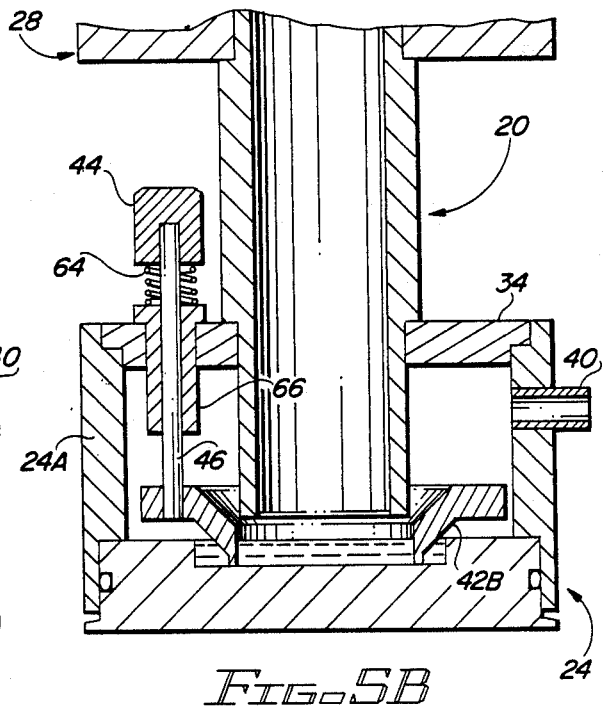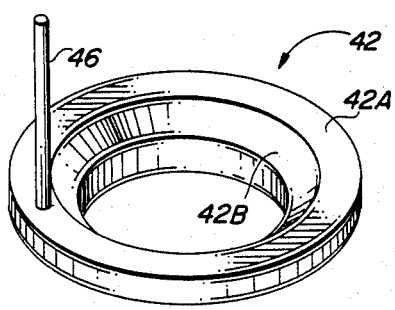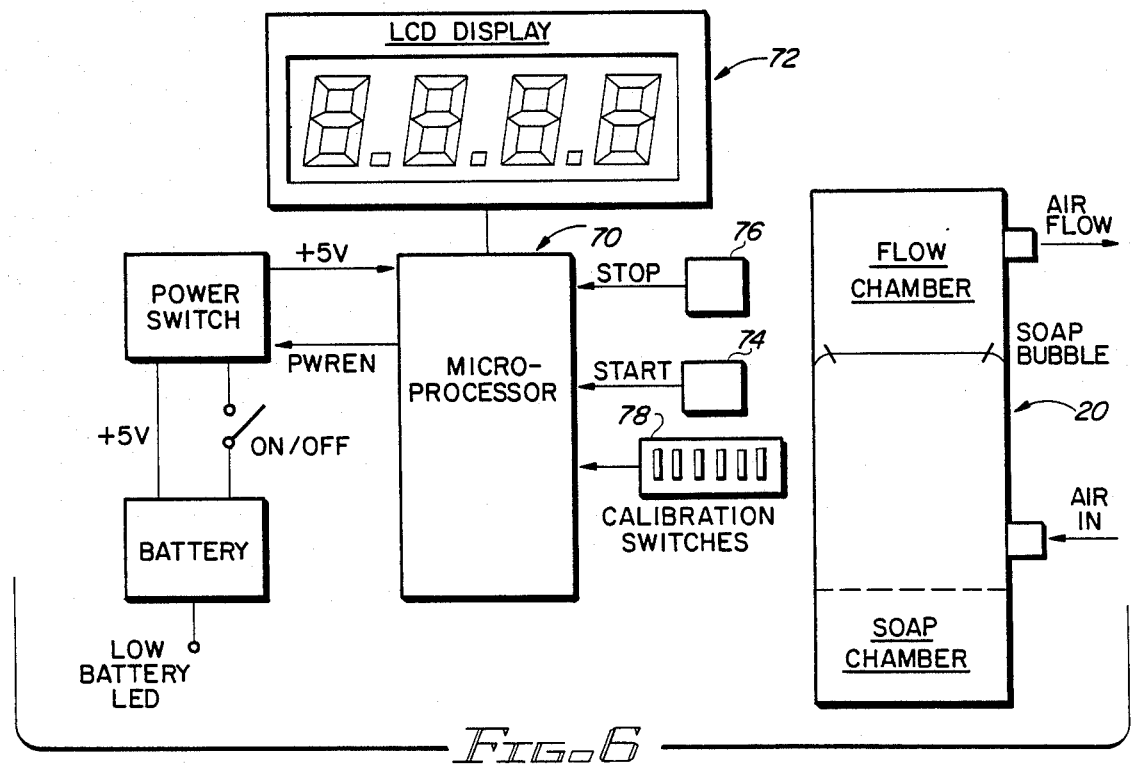

PRIMARY STANDARD GAS FLOW CALIBRATOR

FIELD OF THE INVENTION

This invention relates in general to gas flow meters and, in particular, to a primary standard gas flow calibrator for measuring flow rates of gases.

BACKGROUND OF THE INVENTION

In the past, various methods have been used to measure the flow rates of gases. Using one of these methods, attempts have been made to develop a portable apparatus which accurately measures the flow rate of a gas source through a fixed volume by monitoring the travel time of a liquid soap film moving through an elongated cylindrical tube in response to the flow of the gas through the tube. Numerous devices incorporating this measurement method have been developed in the past, the prior art including a flow standard manufactured by A. P. Buck, Inc., 3139 S. Orange Ave., Orlando, Fla. 32806. Generally, such devices have used a microprocessor in combination with sensing circuits to measure the time for a soap film pushed by the gas flow to travel between a pair of electro-optic sensors placed in a tube. The travel time of the soap film is proportional to the flow rate at which a volume of gas passes between the electro-optic sensors. Thus, the flow rate of the gas is computed based on the volume of the tube and the time for the soap film to travel a predetermined distance. Devices of this general design have achieved accuracy levels of approximately + or −0.5%.

Prior designs have experienced difficulty in developing suitable soap films in flow meters. Typically, more than a single film of soap is formed or a film is formed which is not perpendicular to the tube wall. Other factors which are believed to have limited the success of such devices include the difficulty of providing and maintaining an adequate layer of liquid soap on the inner wall of the tube in order to effect smooth low-friction movement of thin soap films through the tube; the need for a more reliable means of returning the soap film material to a reservoir in the device; the practice of positioning each light emitting device along the measurement tube wall in more or less of a diametrically opposite position with respect to each corresponding light sensing device, thus necessitating a bulky instrument design; and the difficulty of bringing the performance of such devices into acceptable tolerance limits without precision tolerancing of tube dimensions and sensor locations on the tube. Such exacting dimensions have significantly affected manufacturing costs. Furthermore, because such portable devices are needed for field calibration of pumps and inspection of equipment, it is desirable to have a more reliable device of smaller size and weight than available in the prior art yet which device also assures an acceptable level of accuracy.

SUMMARY OF THE INVENTION

Among the several objects of the present invention may be noted the provision of an improved primary gas flow calibrator which overcomes the above discussed limitations or undesirable features, as well as others, of the prior art; the provision of an improved method for generating thin films of soap for use in a gas flow calibrator; the provisions of an improved primary gas flow calibrator including a means for bringing flow measurements within acceptable tolerance limits notwithstanding variations in the dimensions of the flow tube beyond specified tolerances; the provision of such an improved primary gas flow calibrator including a means for reliably establishing a single film of soap across one end of a flow tube; the provisions of such an improved calibrator further including a reliable, repeatable means for positioning a single soap film for motion through a flow tube in an orientation which is always perpendicular to the flow tube wall; the provisions of such an improved calibrator including a flow tube design which assures the straight vertical rise of thin soap films during gas flow; the provisions of such an improved primary gas flow calibrator further including a reliable means of breaking soap films when they rise to the top of a flow tube and returning soap film forming material to a reservoir beneath the flow tube; the provisions of such an improve device further including a method for recoating the inner wall of a flow tube with soap in order to sustain low friction movement of soap films through the tube; the provisions of such an improved gas flow calibrator eliminating the necessity of placing optical emitters and detectors at more or less opposing positions along the wall of a flow tube, thus reducing the size and weight required for portable primary gas flow calibrators.

In general, an improved primary gas flow calibrator in one form of the invention is provided with a ring which is in sliding contact with a flow tube and a soap reservoir in order to form a single film of soap across a first end of the flow tube, the soap film being positioned to respond to gas flow into the flow tube by moving through the flow tube at a speed which is proportional to the flow rate of the gas. A pair of electro-optic sensors are positioned along the wall of the flow tube in order to detect light signals reflected from opposite positions along the wall of the flow tube corresponding to movement of the soap film. A ridge encircles the inner wall of the tube at a position above the electro-optic sensors in order to impede movement of the film along the tube and cause it to distend into a spherical shape, thus thinning it for ease of rupture.

Also in general, a method in one form of the invention is provided for avoiding exacting dimensional tolerances of flow tubes during the manufacture of primary gas flow calibrators. The method includes the provision of adjustments to a microprocessor computation system in order to offset deviations in computed flow rates which result from flow tube variations.

BRIEF DESCRIPTION OF THE DRAWINGS

FIGS. 5A, 5B and 5C illustrate the inventive film forming mechanism; and

FIG. 6 is a functional block diagram of the inventive monitor.

DETAILED DESCRIPTION OF THE PREFERRED EMBODIMENT

Figure 1:
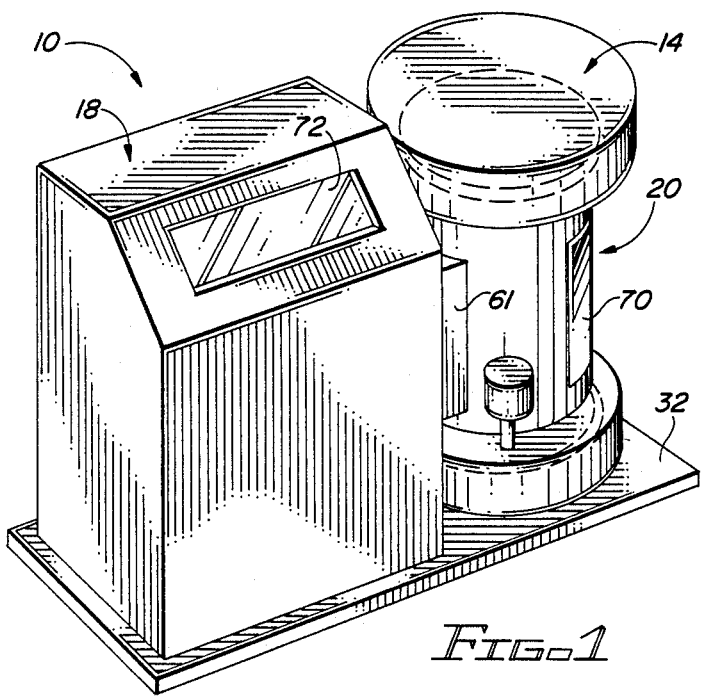
FIG. 1 is a front elevational view of the inventive primary standard gas flow meter illustrating the microcomputer monitor and flow cell.
Figure 2:
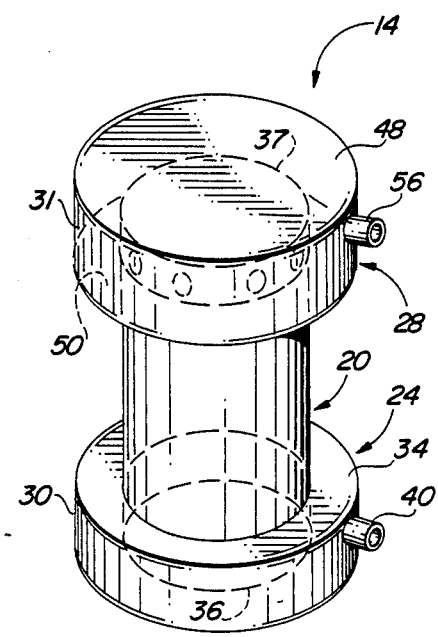
FIG. 2 is a simplified view of the inventive flow cell illustrating the flow tube having a reservoir at one end and a return chamber at an other end.

With reference to FIG. 1, there is illustrated in one form of the invention, an improved primary gas flow calibrator 10 having as its major components a flow cell 14 and a microcomputer based monitor 18 each attached to a base portion 32. With reference to FIG. 2, flow cell 14 comprises a cylindrical measurement tube 20 having a first end 36 disposed within a cylindrically shaped reservoir 24. A second end 37 is disposed within a cylindrically shaped return chamber 28. In the preferred embodiment reservoir 24 and return chamber 28 have inside diameters which are relatively greater than the outside diameter of tube 20 so that reservoir 24 and chamber 28 enclose the ends of tube 20. Reservoir 24 comprises a cylindrical wall 30 sealed at its lower end to base 32 in order to contain fluids within the reservoir. An annular plate 34 hermetically seals reservoir 24 to measurement tube 20 at a position above the first tube end 36 so that first end 36 protrudes into reservoir 24. Similarly, return chamber 28 comprises a cylindrical wall 31 sealed at a first end by plate 48. A second end of wall 31 is sealed to the outside wall of tube 20 by annular plate 50 so that the second tube end 37 protrudes into chamber 28.

Figure 3:
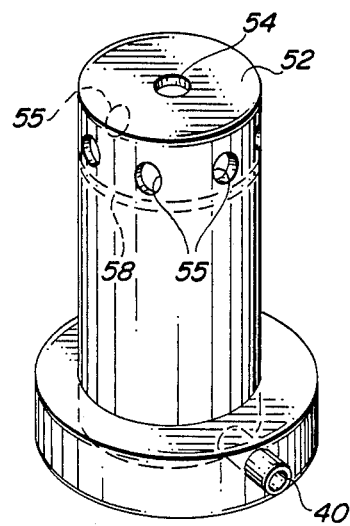
FIG. 3 illustrates selected details of the measurement tube and return chamber of the inventive flow cell.

Turning briefly to FIG. 3, a cap 52 covers the second tube end 37, the cap having a centrally positioned aperture 54 for exiting gas from the tube into chamber. An outlet port 56 on wall 31 of chamber 28 provides an exit path for the gas. A ridge 58 encircles the interior of tube 20 near the cap 52. Adjacent an upper edge of ridge 58 there are a plurality of apertures 55 through the tube wall. The apertures open into chamber 28 approximately level with plate 50 so that any soap escaping through aperture 54 is captured in chamber 28 from whence it flows through apertures 55 back into tube 20 for return to reservoir 24.

Figure 4A:
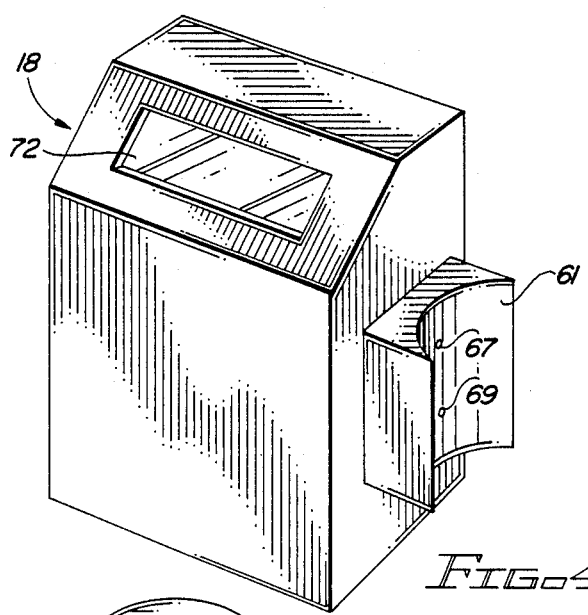
FIGS. 4A and 4B illustrate the inventive sensor block.
Figure 4B:
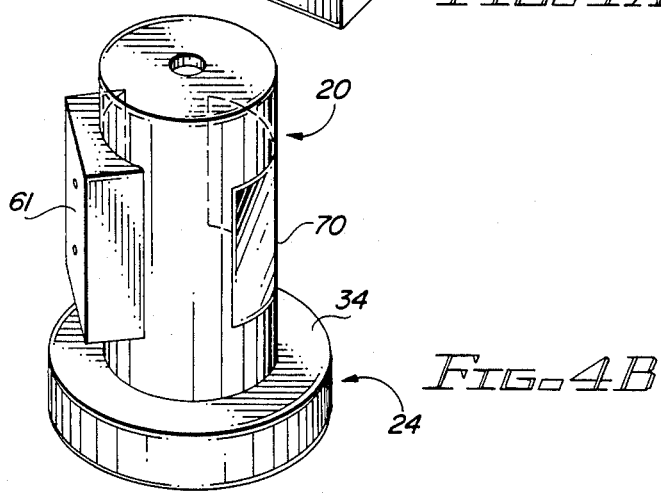

Referring to FIGS. 4A and 4B, there is located between ridge 58 and annular plate 34, and positioned along the outside of tube 20, a sensing block 61 which connects monitor 18 to flow cell 14. Block 61 comprises a pair of light emitting devices and a pair of light sensing devices (not shown) of a type well known in the art. In a preferred embodiment, one light emitting device and one light sensing device are located at each of the positions 67,69 on block 61. Preferably, infrared devices are utilized so that the apparatus is not affected by normal lighting. At least one reflective surface 70 is positioned diametrically opposite positions 67 and 69, on an outside wall of tube 20, for reflecting light from the emitting devices to the sensing devices. The novel combination of reflective surface with the emitting and sensing devices overcomes a disadvantage found in the prior art. More particularly, the prior art required corresponding emitting and sensing devices spaced apart along a measurement tube wall in order for a detector to receive a direct signal from an emitter. This constraint required the placement of corresponding emitting and sensing devices in more or less diametrically opposed positions along the measurement tube wall and this resulted in more cumbersome and heavy meters. With Applicant's combination, the flow calibrator is embodiment in a lightweight, portable unit.

Referring to FIGS. 5A–5C, there is illustrated Applicant's inventive mechanism for establishing a single soap film and for introducing the film into the flow tube 20. FIG. 5A is a cross section through reservoir 2 and the lower end 36 of tube 20. A soap solution indicated at 62 fills the lower portion of reservoir 24. A ring 42 fits around the end 36 of tube 20 and is supported in the raised position of FIG. 5A by a shaft 46 extending upward through plate 34. A button or cap 44 is attached to an end of shaft 46 above plate 34 and a compression spring 64 is positioned around shaft 46 between button 44 and plate 34. The spring 64 exerts a force between button 44 and plate 34 to hold ring 42 in the raised position. Shaft 46 passes through a guide 66 attached to plate 34. The guide 66 acts as a seal due to the fit between shaft 46 and the aperture for the shaft and also serves as an upper stop for positioning ring 42.

As can be seen, the ring 42 is formed with a radially extending outer flange 42A and a funnel-shaped radially inward extending portion 42B. A perspective view is shown in FIG. 5C. The configuration of ring 42 is such that gas entering reservoir 24 through port 40 is directed downward around the outer surface of ring 42 to the open end 36 of tube 20. As shown in FIG. 5B, when ring 42 is depressed downward, the radially inward edge passes below end 36 allowing the gas to flow over the inner surface of portion 42B and into tube 20. Further depression of ring 42 causes the lower end of funnel-shaped portion 42B to enter the soap solution. Movement of the ring 42 is clearly controlled by pushing and/or releasing the button 44 on shaft 46.

When the ring 42 moves upward out of the soap solution 62, a soap film is formed across its lower end. As the film is brought into contact with the open end 36 of tube 20, the gas passing around the outer surface of ring 42 pushes the film into tube 20. The rate of travel of the film through tube 20 is directly proportional to the flow rate of gas into port 40.

The unique structure of ring 42 and its relationship with tube 20 results in only a single film being formed each time the ring is pressed into and released from soap solution 62.

The construction of reservoir 24 is also shown in FIGS. 5A and 5B. The outer cylindrical portion 24A is formed from a cylindrical tube of plastic, preferably clear LEXAN polycarbonate. The plate 34 is formed to fit into the upper end of portion 24A. The base 24B fits into the lower end of the reservoir and incorporates a recessed area 24C for containing the soap solution.

The essential elements of flow cell 14 having been presented, a method for operating the flow cell for determination of a gas flow rate is now described. A soap solution suitable for forming thin films is placed in reservoir 24 through inlet port 40. Measurement tube 20 is wetted with the soap solution by connecting a gas source to the inlet port 40 and repeatedly depressing and releasing button 44 so that ring 42 repeatedly places a film of soap across the first end 36 of tube 20. It will be observed that the flowing gas will move each soap film along the interior wall of tube 20 thus wetting the interior surface of tube 20. This procedure of coating the inner surface of tube 20 is continued until soap films are able to travel to ridge 58 without breaking, thus indicating that the surface is wet with adequate soap solution to provide low friction movement of the soap film along the tube wall. With the flow cell now prepared for measurement, the gas source to be monitored is connected to the inlet and outlet ports 40, 56 of the flow cell. With the sample gas flowing through the flow cell, button 44 is depressed and released thus forming a single film of soap across first end 36 of measurement tube 20. As ring 42 returns to its uppermost position placing the soap film across tube end 36, gas flow causes the soap film to move up tube 20. As the soap film moves upward, it passes first by aperture 69 interrupting the infrared light beam and providing a first signal to the monitor 18. Further movement brings it pass aperture 67 where the second beam is interrupted and a second signal generated. The monitor 18 computes the gas flow rate based upon the time between the first and second signals and the area of tube 20. At ridge 58, the edges of the film are stopped while the gas flow causes the film to distend into a bubble shape thus stretching and thinning the film. If the film reaches end cap 52 before bursting, the concentrated pressure at aperture 54 will rupture the film and allow the solution to return down tube 20 to reservoir 24. Any solution entering chamber 28 through aperture 54 may flow back into tube 20 through apertures 55.

Referring now to FIG. 6, monitor 18 comprises a microcomputer 70, a liquid crystal display 72, a start control 74 and a stop control 76. In the preferred embodiment, microprocessor 70 is an 8-bit microcomputer with multiplexed address/data bus, two bidirectional input/output ports, an internal timer and two test inputs. An exemplary model is the Intel 8035 microcomputer utilizing a 6-MHz crystal which results in a timer resolution of 80 microseconds.

Knowing the volume of the tube 20 between points of light interruption detected by the sensing devices as the film flows through the tube, the flow rate of the gas is calculated by dividing the volume by the time required for a single soap film to pass through the volume. The sensing device at aperture 69 is coupled to start control 74 and the sensing device at aperture 67 is coupled to stop control 76. Thus, the internal timer of microcomputer 70 is used to monitor the time for a soap film to travel through a predetermined volume. Microcomputer 70 then calculates the flow rate of the gas which has moved the soap film based on the time required for the soap film to traverse through the pre-determined volume. The computed flow rate is indicated on liquid crystal display 72.

Applicant has discovered a method for improving the accuracy of the inventive primary standard gas flow meter by adjusting the microcomputer based monitor 18 in order to compute gas flow rates within desired tolerances. The improved accuracy is achieved by effecting software changes in the microcomputer program in order to account for dimensional variations which influence the magnitude of the volume used in computation of the flow rate. This and other sources of error may be avoided by passing a gas source having a known flow rate through the calibrator 10 and then comparing the known flow rate with the measured flow rate calculated by the calibrator. This deviation, which is due in part to error in volume magnitude, may then be offset by adjusting DIP switches 78 which are coupled to microcomputer 70. The DIP switch adjustments are read by calibrator software in order to bring measurements made with the primary standard gas flow calibrator within acceptable tolerance limits. It has been found that this method for improving the accuracy of a flow meter is an economical and suitable alternative to precision manufacture of the flow cell which has in the past affected the cost of manufacture.

A pseudocode listing of software for performing computation of gas flow follows. The program calculates the flow rate of the gas based on the time required for a soap film to traverse the predetermined volume. Computations of volumetric flow are based in part on the settings of DIP switches 78. For example, the main program reads the DIP switch positions (READ CORRECTION SWITCHES) and uses that data to compute the corrected flow reading. The flow computations are given in the following listing:

```
START:   DISABLE EXTERNAL AND TIMER
         INTERRUPTS
         SET POWER ENABLE DISCRETE
         SET PORT 1 ALL HIGH
         ROUTE CLOCK TO T0 FOR TEST
         CLEAR FIRST_PASS FLAG (F1)
         DISPLAY ZEROS AND CLEAR DECIMAL
         POINTS
MAIN:    LOOP
         INITIALIZE FLASH_COUNT TO 4
         CLEAR OUT_OF_TOLERANCE FLAG (F0)
         INITIALIZE DIVIDEND
         READ CORRECTION SWITCHES
         DIVIDEND = DIVIDEND + CORRECTION *
         CORRECTION MULTIPLIER
         DIVIDEND = DIVIDEND/
         2**DIVIDEND_SHIFT
         TIME = 0
         RATE = 0
         WHILE START = 0
         IF 7 MINUTES THEN PWREN=OFF
         AND STOP
         ENDWHILE
         START HARDWARE TIMER
         DISPLAY DASHES
         WHILE STOP = 0
         IF TIMER OVERFLOW THEN
         TIME = TIME + 1
         IF TIME OVERFLOW THEN
         STOP TIMER
         GO TO ERROR
         ENDIF
         ENDIF
         ENDWHILE
         STOP TIMER
         COUNT = TIME (80 MICROSECONDS LSB)
DISP:    RATE = DIVIDEND/ COUNT
LIMIT:   IF RATE CUPPER GO TO ERROR
         IF RATE CLOWER AND LOW_CUTOFF_
         ENABLED GO TO ERROR
AVG:     IF FIRST_PASS THEN
         SET FIRST_PASS FLAG
         URATE = RATE +
         ALLOWED_ERROR * RATE
         LRATE = RATE -
         ALLOWED_ERROR * RATE
         ARATE = RATE
         GO TO DSTUFF
         ENDIF
         IF NOT FIRST_PASS THEN
         IF RATE URATE OR RATE LRATE THEN
         SET OUT_OF_TOLERANCE FLAG
         ARATE = RATE
         GO TO DSTUFF
         ENDIF
         ARATE = ( ARATE + RATE )/2
         ENDIF
DSTUFF:  WHILE FLASH_COUNT 0
         GET DECIMAL_POINT
         DISPLAY ARATE
         DELAY 0.5 SECONDS
         IF OUT_OF_TOLERANCE THEN
         BLANK DISPLAY
         DELAY 0.1 SECONDS
         DISPLAY "EEEE"
         DELAY 0.3 SECONDS
         BLANK DISPLAY
         DELAY 0.1 SECONDS
         ELSE
         BLANK DISPLAY
         DELAY 0.5 SECONDS
         ENDIF
         ENDWHILE
         ENDLOOP
ERROR:   DISPLAY "EEEE"
```

```
CLEAR FIRST_PASS FLAG
GO TO MAIN
END
```

There has been shown a novel device for measurement and calibration of gas flow. A method has been presented for formation of a thin soap film which is used to effect measurement of gas flow. A method has been disclosed for the adjustment of a primary standard flow meter in order to bring computed gas flow rates within desired tolerance limits. It is contemplated that changes as to the precise arrangements, shapes and details of the embodiments illustrated herein by way of example for purposes of disclosure, as well as the precise steps and order thereof in the methods, may be made by those having ordinary skill in the art without departing from the spirit of the invention or the scope thereof as defined by the claims which follow.

I claim:

1. A primary standard gas-flow meter comprising:
   (a) a tube having an inner surface, an outer surface, a first end and a second end;
   (b) a reservoir for containing a film-forming fluid, said reservoir being connected to the first end of said tube and having a least one inlet port for admitting as to said tube;
   (c) return means for returning the film-forming fluid to said reservoir through said tube for wetting said inner surface of said tube and for existing gas from said tube;
   (d) a ring in sliding contact with said tube adjacent the first end thereof, said ring being dimensioned to slide into fluid contained within said reservoir; and
   (e) means extending outwardly of said tube and connected to said ring for imparting sliding motion of said ring into and out of said reservoir, said ring being effective to establish a single film extending across the first end of said tube when said ring moves out of the film-forming fluid in said reservoir so that the film is positioned to respond to gas flow into said reservoir by moving through said tube at a speed proportional to the rate of gas flow.

2. The primary standard gas flow meter of claim 1 further comprising:
   (a) ridge means positioned on the inner surface of said tube for distending the film;
   (b) a cap positioned at the second end of said tube, having a centrally positioned aperture for exiting gas from said tube and returning a film-forming fluid to said reservoir; and
   (c) a chamber covering said cap and a portion of the outer surface of said tube, said chamber including:
      (i) at least one aperture connecting said chamber to the interior of said tube, the at least one aperture being positioned on the outer wall of said tube between said ridge means and said cap, thereby permitting gas to flow into said chamber and permitting film-forming substances to return from said chamber to said reservoir; and
      (ii) at least one outlet port to release gas from said apparatus.

3. The primary standard gas flow meter of claim 2 further comprising measurement means for sensing the passage of the film as the film moves through a portion of said tube.

4. The primary standard gas flow meter of claim 3 wherein said ring comprises an outer member and a funnel-shaped inner member, said inner member extending toward the film forming fluid, a gas flow path being formed above said ring when a lower end of said inner member is below said tube and a flow path being formed around an outer surface of said ring when said inner member contacts said tube.

5. The primary standard gas flow meter of claim 4 wherein said measurement means comprises:
   (a) a first light emitter and sensor located at a first position along said tube;
   (b) a second light emitter and sensor located at a second position along said tube; and
   (c) reflective means positioned for reflecting emitted light from each emitter to a corresponding one of the sensors, the film being detected by interruption of the emitted light.

6. The primary standard gas flow meter of claim 4 wherein said ridge means comprises a ridge encircling the interior wall of said tube positioned between said measurement means and the second end of said tube.

7. The primary standard gas flow meter of claim 6 further comprising:
   (a) processing means for computing the rate of gas flow based on the time required for the film to pass between the first and second positions along said tube; and
   (b) calibration means for adjusting computed values of gas flow rates to fall within calibrated tolerance limits.

8. The apparatus of claim 7 wherein said calibration means comprises a plurality of DIP switches which modify computed rates of gas flow.

9. A method for forming a liquid film across one end of a measurement tube in a flow cell while a gas is flowing through the flow cell and for returning the liquid to a reservoir, the measurement tube being in sliding contact with a ring and positioned above a film-forming fluid, the method comprising:
   (a) sliding the ring downward so that a first end of the ring becomes immersed in the fluid;
   (b) raising the ring out of the fluid so that a thin film forms across the first end of the ring;
   (c) sliding the first end of the ring into contact with the one end of the measurement tube so that the thin film is transferred to a lower end of the tube;
   (d) admitting gas to the tube below the first end of the ring whereby the film is pushed through the tube by the gas; and
   (e) bursting the film at an upper end of the tube whereby the fluid flows downward along an inner surface of the tube for lubricating the inner surface.

* * * * *